United States Patent [19]

Pfeiffer et al.

[11] Patent Number: 4,756,886
[45] Date of Patent: Jul. 12, 1988

[54] ROUGH CUT SOLIDS SEPARATOR

[75] Inventors: Robert W. Pfeiffer, Bronxville, N.Y.; Lisbeth T. Pfeiffer, South Richfield, Minn.

[73] Assignee: Stone & Webster Engineering Corporation, Boston, Mass.

[21] Appl. No.: 850,144

[22] Filed: Apr. 10, 1986

[51] Int. Cl.$^4$ ............................................. B01J 8/18
[52] U.S. Cl. ...................................... 422/144; 55/319; 55/462; 55/465; 422/145; 422/147
[58] Field of Search ............... 422/144, 145, 147; 55/319, 462, 465; 208/161

[56] References Cited

U.S. PATENT DOCUMENTS

| | | |
|---|---|---|
| 2,737,479 | 7/1953 | Nicholson . |
| 2,787,891 | 10/1953 | Ross et al. . |
| 3,074,878 | 1/1963 | Pappas . |
| 3,835,029 | 4/1972 | Larson . |
| 3,841,843 | 10/1974 | Williams et al. ............... 422/144 |
| 3,957,443 | 5/1976 | Strickland et al. ............. 422/147 |
| 4,288,235 | 9/1981 | Gartside et al. . |
| 4,348,364 | 9/1982 | Gartside et al. . |
| 4,433,984 | 2/1984 | Gartside et al. . |

Primary Examiner—Barry S. Richman
Assistant Examiner—William R. Johnson
Attorney, Agent, or Firm—Hedman, Gibson, Costigan & Hoare

[57] ABSTRACT

A gas-solids separator to remove particulate solids from a mixed phase stream of solids and gas which has a frusto-conical chamber having substantially conical walls tapering downwardly and outwardly and means defining at least one opening in said conical walls for conveying through the conical walls substantially solids free gas separated from the mixed stream of solids and gas.

16 Claims, 8 Drawing Sheets

ROUGH CUT SOLIDS SEPARATOR

BACKGROUND OF THE INVENTION

1. Field of the Invention

This invention relates generally to a separation system to obtain a separation of particulate solids from a mixed phase gas-solids stream and particularly to a separation system for separating the spent catalyst from the cracked hydrocarbon effluent stream of an FCC riser reactor.

Chemical reaction systems utilizing solids in contact with a gaseous or vaporized stream have long been employed. The solids may participate in the reaction as catalyst, provide heat required for an endothermic reaction, or both. Alternatively, the solids may provide a heat sink in the case of an exothermic reaction. Fluidized bed reactors have substantial advantages, most notably an isothermal temperature profile. However, as residence time decreases the fluidized bed depth becomes shallower and increasingly unstable. For this reason, tubular reactors employing solid-gas contact in pneumatic flow have been used and with great success particularly in the catalytic cracking of hydrocarbons to produce gasolines where reactor residence times are between 0.5 and 5 seconds, optimally about 2 seconds.

In general, catalytic cracking of relatively high boiling hydrocarbons to form substantial quantities of materials boiling in the gasoline range is carried out in the following process sequence: hot regenerated catalyst is contacted with a hydrocarbon feed in a reaction zone under conditions suitable for cracking; the cracked hydrocarbons are separated from the spent catalyst using conventional cyclones and the spent catalyst is subsequently fed to a regeneration chamber where a controlled volume of air is introduced to burn the carbonaceous deposits from the catalyst after which the regenerated catalyst is transferred to the reactor for reuse.

With the advent of improved catalysts, total reactor residence times in some processes can be as low as 0.2 to 1.0 second. However, with residence times below 2 seconds and specifically below 1 second, the ability to separate the gaseous products from the solids is diminished because of the residence time requirements of conventional separation means such as cyclones. The residence time requirements of cyclones represents a disproportionate fraction of the allowable residence time. In an FCC system, conventional separation systems may consume more than 35% of the allowable contact time between the two phases resulting in product degradation, coke formation, low yields and varying severity. In catalytic cracking at lower or moderate temperatures, quench of the product gas in the presence of catalyst is undesirable from a process standpoint. In other processes, the quench is uneconomic in terminating the reaction in the presence of catalyst. Thus, these reaction systems require immediate separation of the phases to remove catalyst from the gas phase as a means for removing the reaction mechanism.

The prior art has attempted to separate the phases rapidly by use of centrifugal force or deflection means.

Nicholson U.S. Pat. No. 2,737,479 combines reaction and separation steps within a helically wound conduit containing a plurality of complete turns and having a plurality of gaseous product drawoffs on the inside surface of the conduit to separate solids from the gas phase by centrifgual force. Solids gravitate to the outer periphery of the conduit, while gases concentrate at the inner wall, and are removed at the draw-offs. Although the Nicholson reactor-separator separates the phases rapidly, it produces a series of gas product streams each at a different stage of feed conversion. This occurs because each product stream removed for the multiple product draw-offs which are spaced along the conduit is exposed to the reaction conditions for a different time period in a reaction device which has inherently poor contact between solids and gases.

Ross et al U.S. Pat. No. 2,878,891 attempted to overcome this defect by appending to a standard riser reactor a modification of Nicholson's separator. Ross's separator is comprised of a curvilinear conduit making separation through a 180° to 240° turn. Centrifugal force directs the heavier solids to the outside wall of the conduit allowing gases that accummulate at the inside wall to be withdrawn through a single drawoff. While the problem of product variation is decreased to some extent, other drawbacks of the Nicholson apparatus are not eliminated.

Both devices effect separation of gas from solids by changing the direction of the gas 90° at the withdrawal point, while allowing solids to flow linearly to the separator outlet. Because solids do not undergo a directional change at the point of separation, substantial quantities of gas flow past the withdrawal point to the solids outlet. For this reason both devices require a conventional separator at the solids outlet to remove excess gas from the solid particles. Unfortunately, product gas removed in the conventional separator has remained in intimate contact with the solids, has not been quenched, and is, therefore, severly degraded.

Another drawback of these devices is the limitation on scale-up to commercial size. As conduit diameter increases the path traveled by the mixed phase stream increases proportionately so that large diameter units have separator residence times approaching those of conventional cyclones. Increasing velocity can reduce residence time, but as velocities exceed 60 to 75 ft./sec. erosion by particles impinging along the entire length of the curvilinear path becomes progressively worse. Reduction of the flow path length by decreasing the radius of curvature of the conduit also reduces residence time, but increases the angle of impact of solids against the wall thereby accelerating erosion.

Pappas U.S. Pat. No. 3,074,878 devised a low residence time separator using deflection means wherein the solid gas stream flowing in a tubular conduit impinges upon a deflector plate causing the solids, which have greater inertia, to be projected away from a laterally disposed gas withdrawal conduit located beneath said deflector plate. Again, solids do not change direction while the gas phase changes direction relative to the inlet stream by only 90° resulting in inherently high entrainment of solids in the effluent gas. While baffles placed across the withdrawal conduit reduce entrainment, these baffles as well as the deflector plate are subject to very rapid erosion in severe operating conditions of high temperature and high velocity. Thus, many of the benefits of separators of the prior art are illusory because of limitations in their efficiency, operable range, and scale-up potential. Gartside et al U.S. Pat. Nos. 4,288,235, 4,348,364, 4,433,984 devised an apparatus for rapidly separating particulate solids from a mixed phase solids-gas stream from tubular type reactors. Separation is effected by projecting solids by centrifugal force against a bed of solids as the gas phase makes a 180° directional change. The solids phase, however is required to undergo two 90° directional changes before exiting the apparatus.

Larson, U.S. Pat. No. 3,835,029 discloses a downflow catalytic cracker entering a cylindrical separator with a series of openings in the outside wall through which the hydrocarbon passes. The catalyst solids pass downwardly to a stripper section and then into a regenerator. Within the equipment and spatial constraints normally encountered in a fluidized bed environment, the separator of Larson would be relatively inefficient because there is no progressively increasing lateral flow path as a function of the height of openings to help effectuate separation once the mixed phase gas solids stream enters the separator.

SUMMARY OF THE INVENTION

It is an object of the separator of this invention to obtain a separation of particulate solids from a mixed phase gas-solids stream.

It is also an object of the separator to effect the separation rapidly and with a minimum of erosion.

An additional object of the separator of this invention is to obtain a separation of particulate solids from a mixed phase gas-solids stream, as particularly adapted for use in an FCC system.

Another object of this invention is to provide a separation system particularly adapted for use in an FCC system in a close quarters environment.

A further object of this invention is to provide a method for rapidly attaining a separation of solids from a mixed phase gas-solids stream.

These and other objects of the invention will be apparent from an inspection of the specification, figures and claims.

The separation device and system of the present invention rapidly disengages particulate solids from a mixed phase gas-solids stream with a minimum of erosion. The separator consists of two chambers, an inner frusto-conical chamber for disengaging the bulk of the particulate solids from the mixed phase stream and an outer chamber for receiving the separated gas and for further removal of residual particulate solids and ultimate conveyance of the gas phase to either an additional particulate solids removal apparatus or to downstream process equipment. Openings in the wall of the inner chamber provide means for the passage of the gas between the two chambers.

The inner frusto-conical chamber has a mixed phase inlet at one end and a solids outlet at the other end. The outer chamber includes a gas phase outlet which is usually oriented normal to the mixed phase inlet and at an elevation above the inner frusto-conical chamber. A second annular solids phase outlet may be connected at the lower end of the outer chamber which is concentric to the first solids phase outlet of the inner frusto-conical chamber. Thus, the inlets and outlets are oriented so that the mixed phase gas-solids stream enters the inner frusto-conical chamber from the top wherein the mixed phase stream velocity decreases and the solids are disengaged from the gas and continue to travel gravitationally toward the solids phase outlet at the bottom of the inner chamber. The gases exit laterally through the openings in the inner chamber wall into the lower pressure annular space between the inner and outer chamber walls. Particulate solids which are carried through the openings may continue to travel downwardly toward the solids phase outlet of the second chamber, particularly the solids that exit near the bottom of the openings. In the annular space the substantially particulate free gas flows upwardly towards the gas phase outlet at the upper end of the outer chamber. Erosion in the separator is minimized because there is little direct impingement of particulate solids on the structural surfaces. However, judicious use of erosion resistant refractory lining for protection of most surfaces is recommended.

In a preferred embodiment, the inside diameter at the top of the frusto-conical chamber is made larger than the inside diameter of the inlet flow passage in order to effect a sudden enlargement of cross-sectional area at the inlet to the frusto-conical chamber for disengaging the solids from the gas stream.

In another embodiment, baffles may be affixed to the inside walls of the inner chamber to further increase the average lateral flow path of the solids passing to the outside chamber.

In one embodiment of the invention for use in an FCC system, the separator is positioned on top of the riser reactor, with the riser ascending therethrough. A cap seals the top of the separator and serves as a deflector which changes the direction of the mixed phase gas-solids stream 180° so as to introduce the mixed phase stream to the separator. By adapting the separator to the top of the reactor riser in place of primary rough cut cyclones, space is preserved since the elbows and pipe runs attendant conventional primary cyclones are eliminated.

BRIEF DESCRIPTION OF THE DRAWINGS

FIG. 4B is a cutaway view of the embodiment of FIG. 4A, taken through section 4a—4a.

DESCRIPTION OF THE PREFERRED EMBODIMENTS

Figure 1:
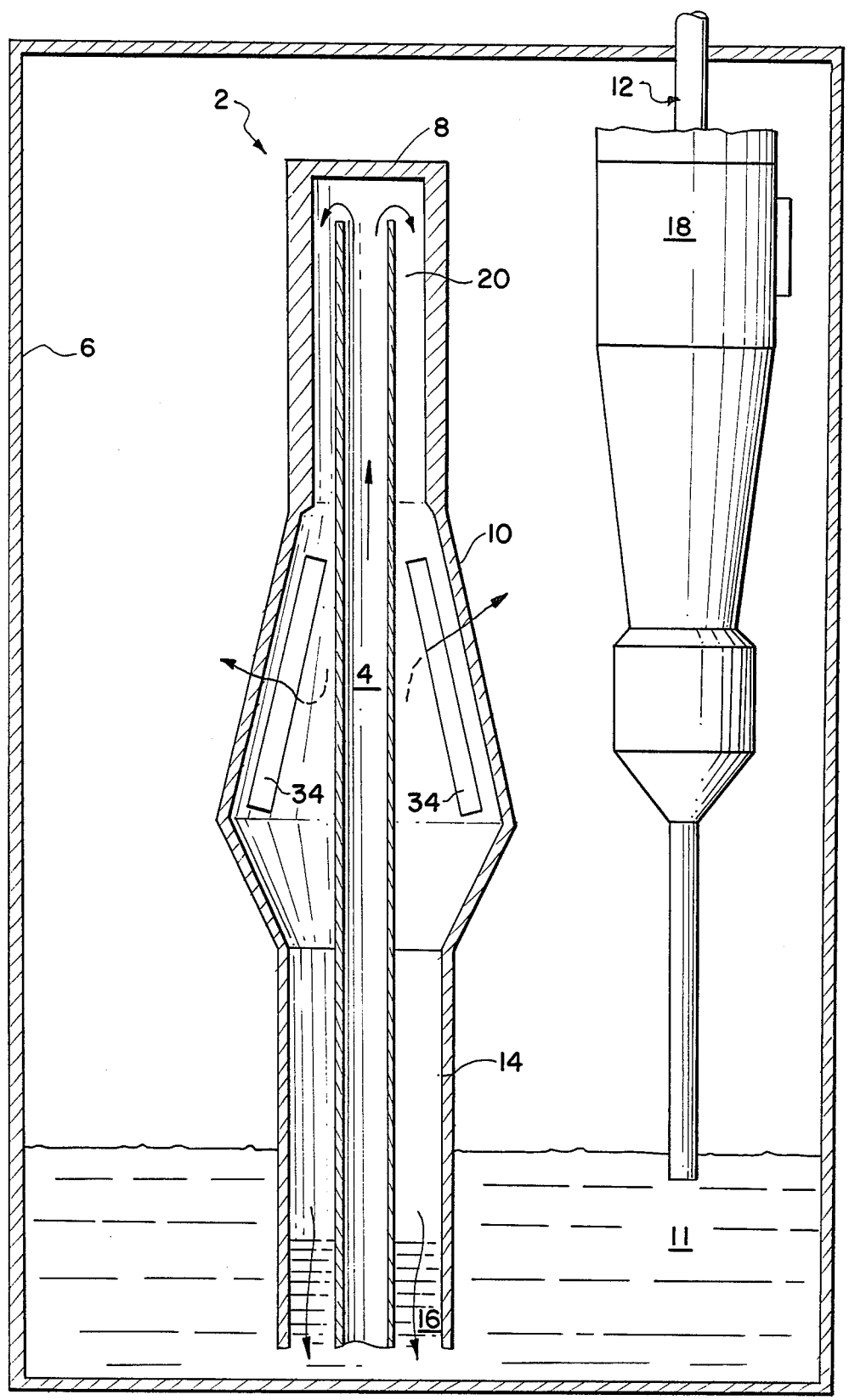
FIG. 1 is a cross-sectional elevational view of the separation system of the present invention as appended to an upflow fluidized solids system.

FIG. 1 is a schematic flow diagram showing the installation of the solids separator 2 of the present invention in a typical upflow fluidized solids system for handling gas-solids mixtures. The mixed phase gas-solids stream flows upwardly in the upflow riser 4 which is centrally positioned within the solids separator 2. The mixed phase riser effluent exits the riser 4 and impinges a deflector cap 8 thereby changing the direction of the mixed phase stream 180°. The deflector cap is designed so as to minimize erosion despite the high temperature and high velocity conditions that may be present. The cap 8 may be of any shape that will accomplish the directional change such as flat, ellipsoidal, spherical, trapezoidal, etc. The riser effluent flows downwardly through an annular inlet 20 wherein the particulate solids are accelerated to velocities approaching the gas velocity and continue to flow directly to a frusto-conical chamber 10 where separation into a gas phase and a solids phase is effected. The gas phase exits the frusto-conical chamber 10 through openings 34 in the conical walls and enters the dilute phase of vessel 6 where entrained solids may be further separated from the gas phase by either or both settling and in conventional cyclones 18. The substantially particulate free product gas exits vessel 6 via line 12. The solids phase is collected and removed from the frusto-conical chamber 10 via a sealed leg 14, which extends below the surface of a fluid bed 11 in vessel 6. A static bed of solids in sealed leg 14 forms a positive seal which prevents gases from escaping through the solids outlet 16 and into the vessel 6.

In the case of a riser reactor, the solids separator 2 disengages solids rapidly from the riser effluent in order to prevent product degradation and ensure optimal yield and selectivity of the desired products. In addition, high separation efficiency can be achieved in the present invention with a pressure drop substantially lower than that required with conventional cyclones. The separator system of the present invention is designed to meet each one of these criteria as described below.

Figure 2A:
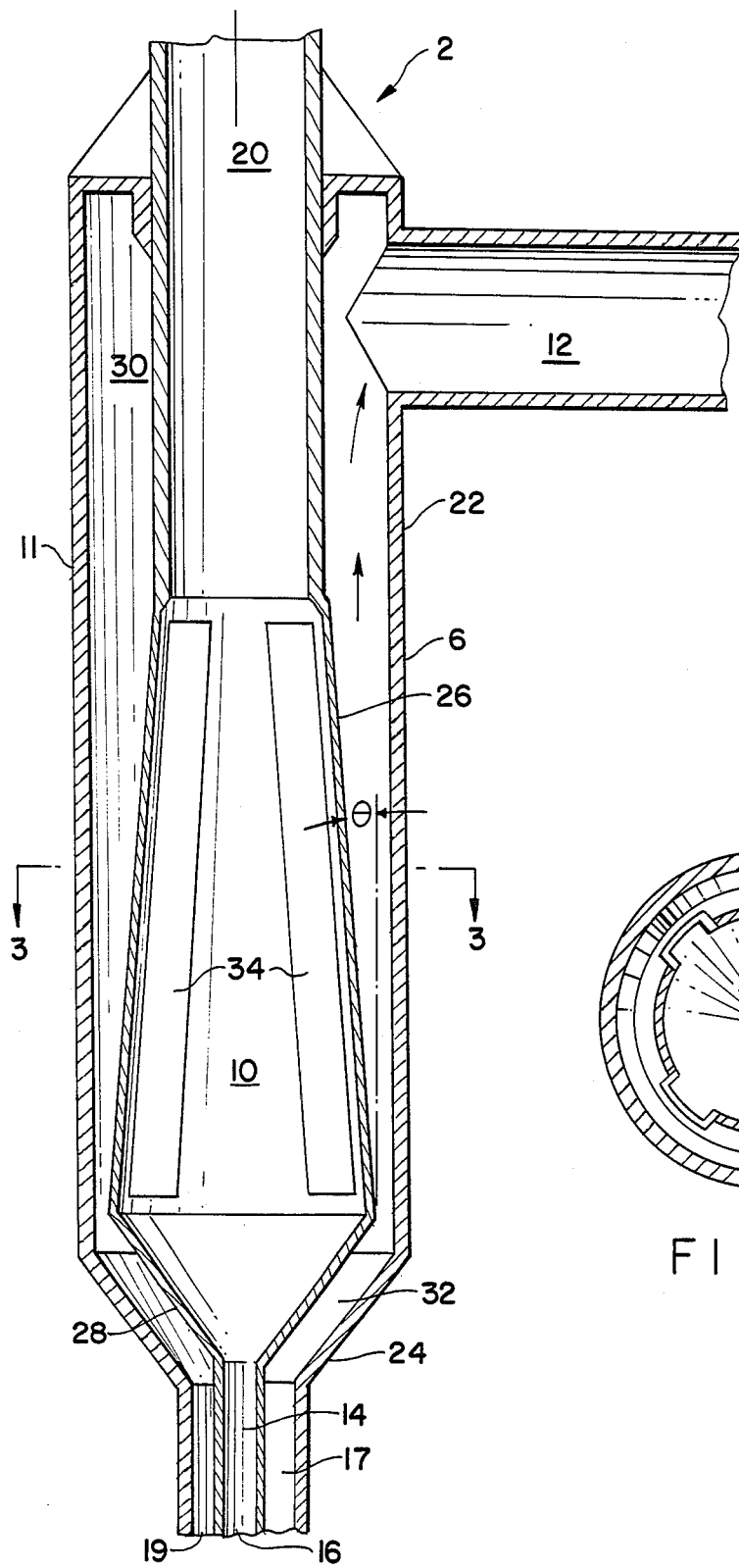
FIG. 2A is a cross sectional elevational view of the separator of the present invention as appended to a downflow fluidized solids system.

FIG. 2A is a cross-sectional elevational view showing the embodiment of the separator 2 of the present invention in a downflow fluidized solids system, and has particular application to fluidized solids riser downcomer systems which are located external to the main vessels.

In FIG. 2A, the separator 2 comprises an outer chamber 6 and a frusto-conical chamber 10 disposed therein, an inlet 20 for introducing the mixed phase gas-solids stream to the frusto-conical chamber 10, a first sealed leg 14 and a first solids phase outlet 16 for removing the solids phase from the frusto-conical chamber 10, a second sealed leg 17 and a second solids phase outlet 19 for removing the solids phase from the outside chamber 6, and at least one gas phase outlet 12.

The outer chamber 6 is closed on top and has generally cylindrical side walls 22, and a bottom wall 24 which tapers downwardly and inwardly from the side walls 22 toward the second sealed leg 17. The gas phase outlet 12 is preferably disposed normal to the outer chamber 6 near the top of the side walls 22. The mixed phase inlet 20 penetrates the top of the outer chamber 6 for accessing the frusto-conical chamber 10. The mixed phase inlet 20 is colinear to the frusto-conical chamber 10 and is in communication with the top of the chamber 10.

The frusto-conical chamber 10 has generally conical walls 26 spaced from the side walls 22 of the outer chamber 6 and tapering from the top outwardly toward the bottom. A bottom wall 28 is provided which tapers downwardly and inwardly from the conical wall 26 toward the first sealed leg 14, thus serving as a funnel for conveying the separated solids from the frusto-conical chamber 10 to the first sealed leg 14 and thence to the first solids phase outlet 16. As shown, the first sealed leg 14 is concentric to and centrally disposed in the second sealed leg 17.

In the embodiment of FIG. 2A it is seen that an annulus 30 is formed between the side walls 22 of the outer chamber 6, the mixed phase inlet 20 and the conical wall 26 of the frusto-conical chamber 10. The annulus 30 is of uniform breadth in the region surrounding the mixed phase inlet 20 from the top of the outer chamber 6 to the entrance of the frusto-conical chamber 10. As shown, the annulus 30 from that point tapers downwardly in a continually narrowing breadth towards the bottom of the frusto-conical chamber 10 as it follows the contour of the conical wall 26.

Figure 2B:
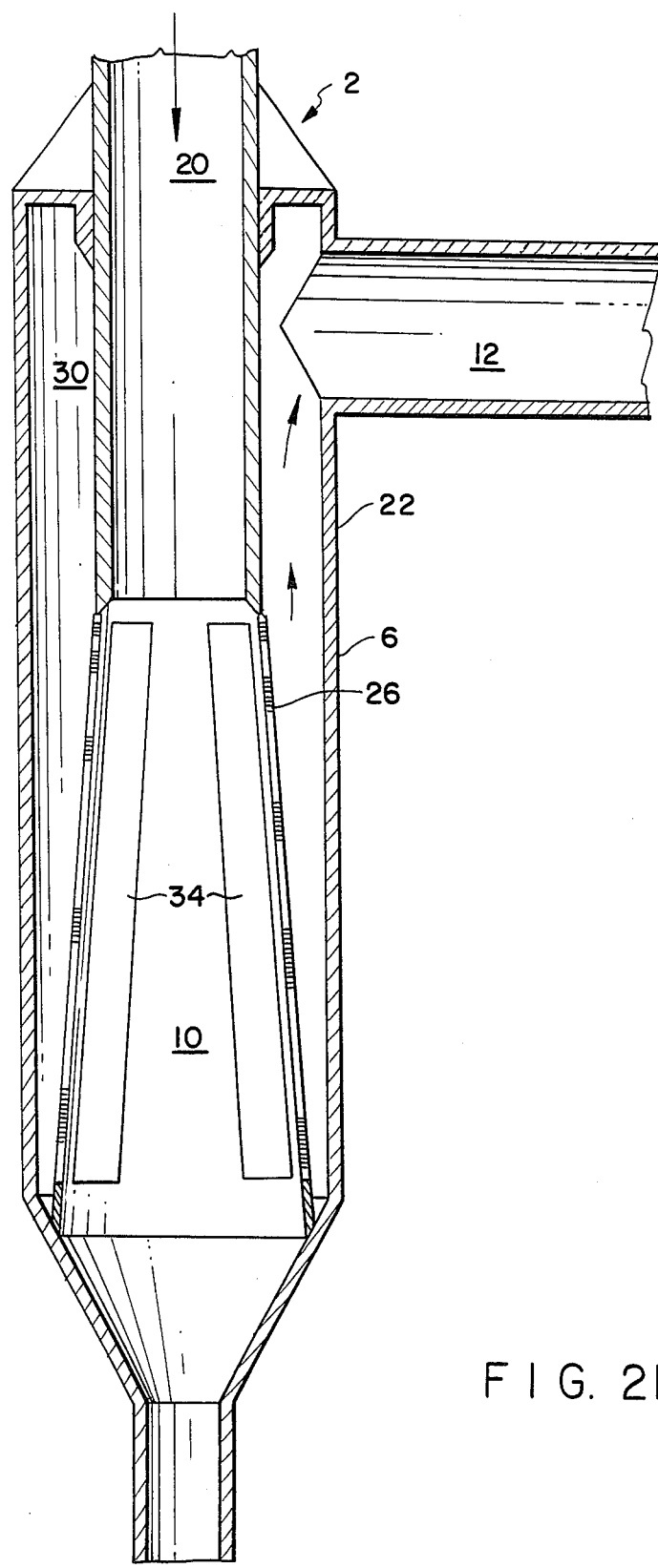
FIG. 2B is a cross sectional elevational view of an alternate embodiment of the present invention having a single solids phase outlet.

A bottom annulus 32 is formed between the bottom wall 24 of the outer chamber 6 and the bottom wall 28 of the frusto-conical chamber 10. The bottom annulus 32 tapers downwardly and inwardly and serves as a conduit for solids to be conveyed from the annulus 30 to the second sealed leg 17. Optionally, the bottom wall 28 of the frusto-concial chamber 10 may be extended outwardly to be contiguous with the bottom wall 24 of the outer chamber 6 thereby obviating the requirement of the second sealed leg 17 (FIG. 2B).

The conical wall 26 of the frusto-conical chamber 10 is provided with openings or slots 34 which allow the gases separated from the mixed phase gas-solids stream to pass from the frusto-conical chamber 10 to the annulus 30 in the outer chamber 6.

Figure 2C:
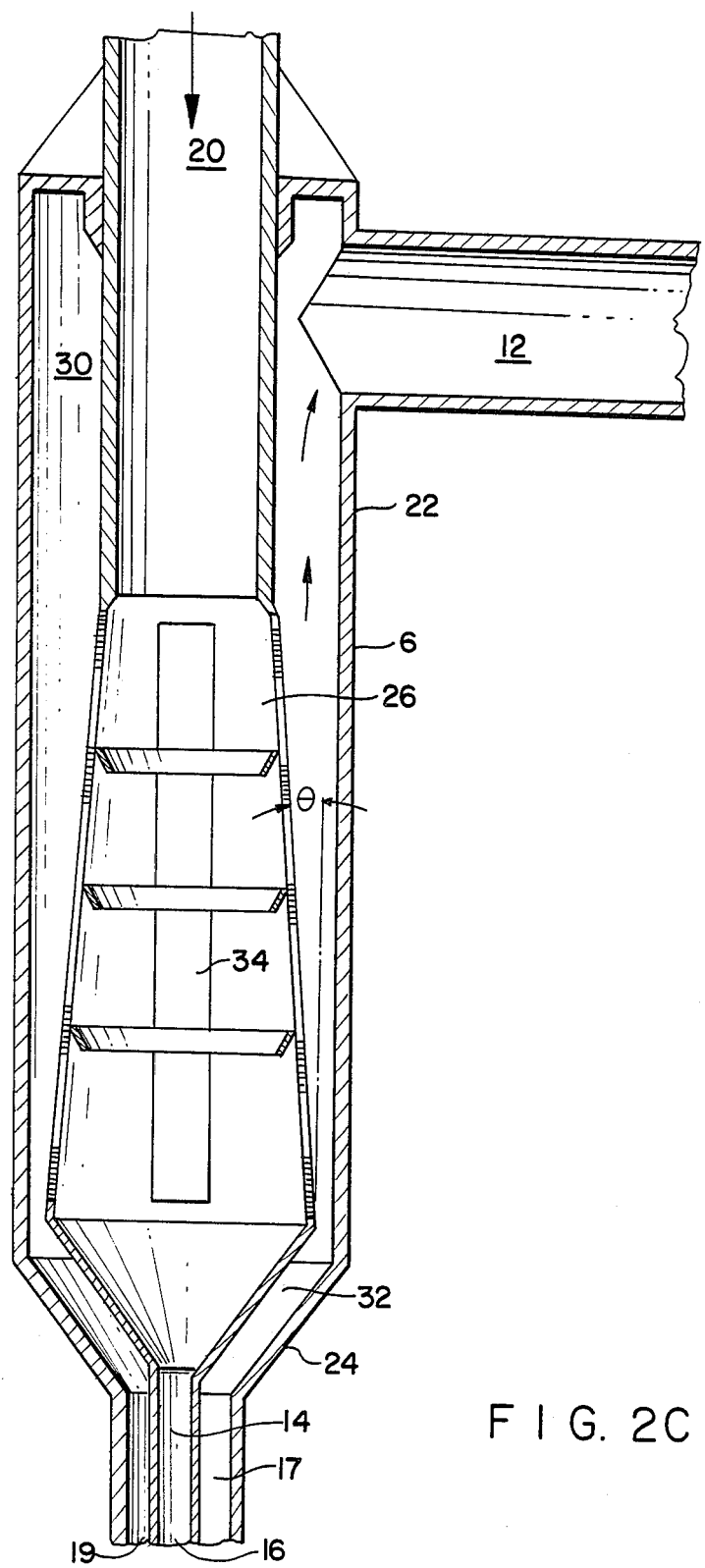
FIG. 2C is a cross sectional elevational view of an alternative embodiment of the present invention employing baffles within the frusto-conical chamber.

Optionally, as shown in FIG. 2C, circular baffles 36 may be affixed to the inside of conical wall 26 to provide a longer average lateral flow path for the gas stream passing from the frusto-conical chamber 10 through the slots 34 to the annulus 30.

Figure 3:
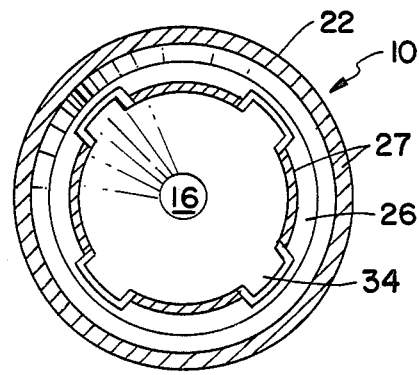
FIG. 3 is a cutaway view of the embodiment of FIG. 2A, taken through section 3—3.

Referring to FIG. 3, there is shown a cutaway view of the frusto-conical chamber 10 taken along line 3—3 of FIG. 2A. The conical wall 26 and side walls 22 are lined with an erosion resistant material 27. Additionally, side walls 22 may be lined with thermally resistant material for external applications. Uniformally spaced openings 34 are provided in the conical wall 26. The first solids phase outlet 16 is shown centrally disposed within the frusto-conical chamber 10.

In using the solids separator 2 of FIG. 2A, a mixed phase gas-solids stream is fed through the inlet 20 where sufficient time is preferably provided to accelerate the solids to a high downward velocity approaching the gas velocity. It has been found desirable to accelerate the solids from 50 to 99% of the gas velocity, in general the higher the better, preferably an average of at least 80%.

Upon entering the frusto-conical chamber 10, the gas phase first instantaneously and then continuously decelerates due to the sudden increase and then gradual increase in cross-sectional area of the frusto-conical chamber 10.

The solids phase, having mass, momentum and gravitational acceleration downwards, will not decelerate as rapidly as the gas phase but will continue downwards towards the first solids phase outlet 16. The gas phase flows in a lateral direction through the gas outlet slots 34 to the lower pressure region of the annulus 30. The gas phase velocity in the frusto-conical chamber 10 continues to decrease as the gas approaches the lower end of the slots 34. At the bottom of the slots 34, the downward gas phase velocity is essentially zero. The vertical drag force of the gas decelerates the vertical velocity of the solids as they descend through the frusto-conical chamber 10. Because of the horizontal drag force of the gas moving laterally, the solids are accelerated laterally and a small percentage of them will pass through the slots 34 and into the annulus 30. However, because of the extremely low gas velocity near the bottom of the slots 34, solids entering near the bottom of annulus 30 will not be carried upwardly with the gas phase, but will descend to the lower annulus 32 to be removed through the second solids phase outlet 19. The gas phase, substantially free of solids, exits the outer chamber 6 through the gas phase outlet 12. The mixed phase inlet 20, the slots 34 and the gas phase outlet 12 are oriented so that the gas phase must complete a 180° change in direction before exiting the outer chamber 6. Depending upon the nature of the process and the degree of separation necessary, one or more additional separators, e.g., conventional cyclones, may be used to further separate the gas phase from residual amounts of solids. If desired, such cyclones may be direct-connected to one or more outlets 12.

Figure 4A:
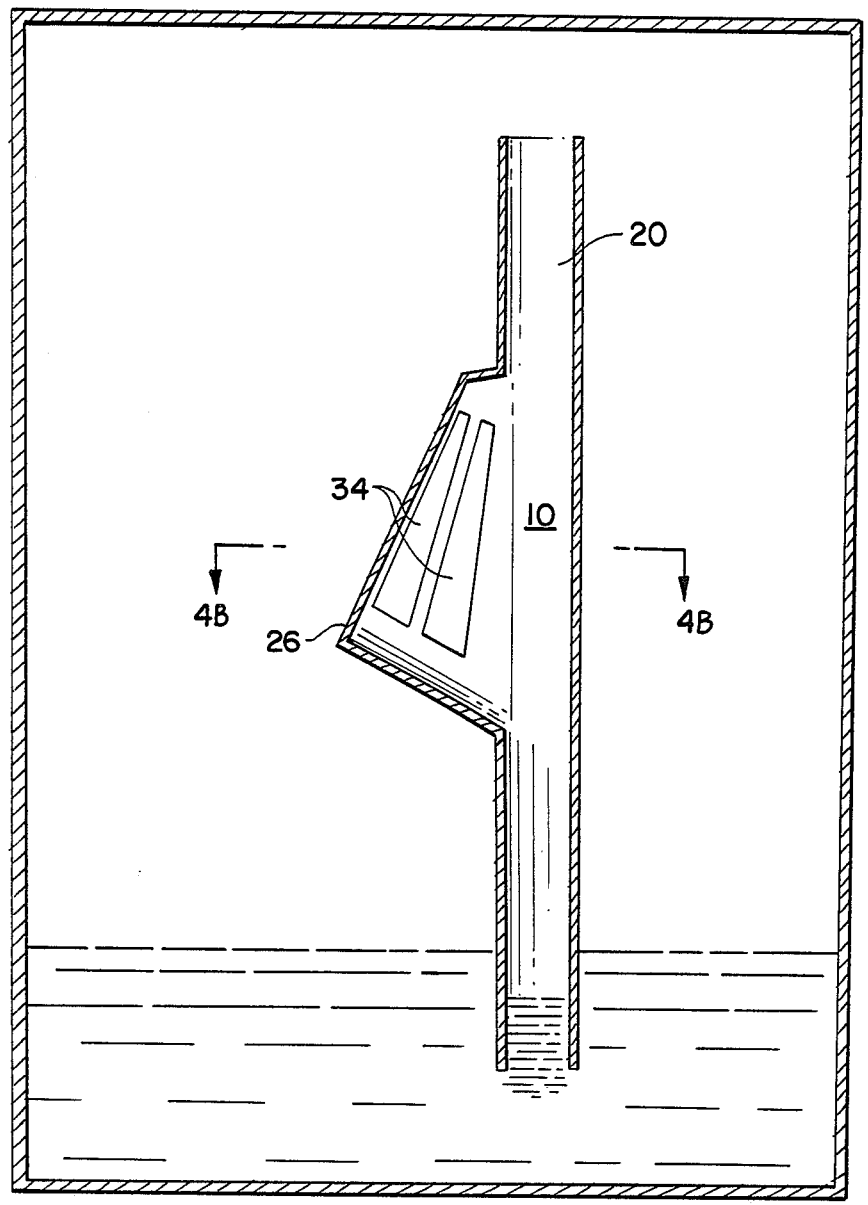
FIG. 4A is a cross-sectional elevational view of an alternate embodiment of the present invention having an eccentric frusto-conical chamber as appended to a downflow fluidized solids system.

The separator of FIG. 4A is a schematic diagram of an alternate embodiment of the separator 2 as appended to a downflow fluidized solids system. In this embodiment, because of the physical constraints, the frusto-conical chamber 10 is eccentric with respect to the vertical axis. As a result, the openings or slots 34 in the conical wall 26 are limited to a maximum range of 180° from the center line through the vertical axis of the inlet 20, preferably 30°–120°. (FIG. 4A).

The eccentricity of the frusto-conical chamber makes it advantageous that the openings 34 be of greater breadth at the bottom of the slot than at the top. In addition, the inlet to the eccentric frusto-conical chamber 10 is made substantially larger than the inside diameter of the inlet flow passage 20 in order to effect a sudden enlargement of cross-sectional area, thereby improving separation of the phases.

Figure 5:
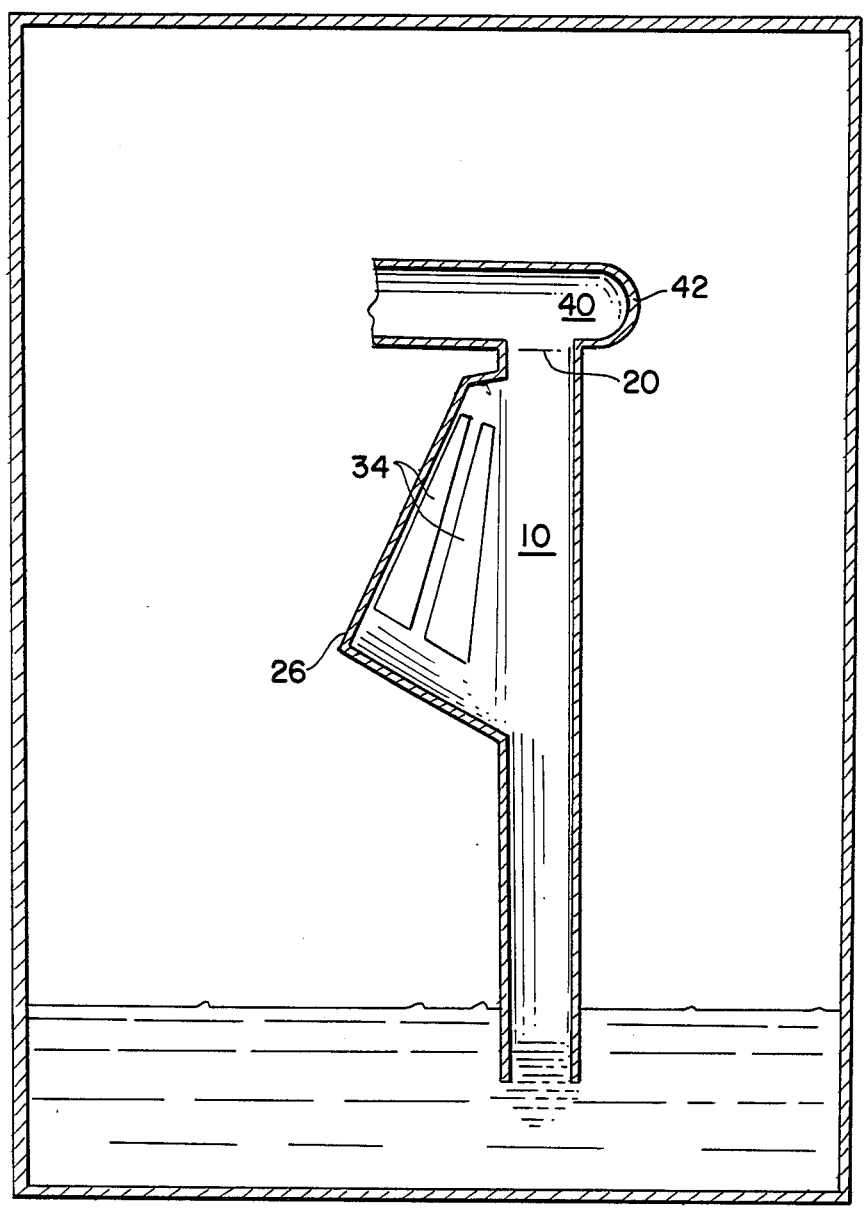
FIG. 5 is a cross-sectional elevational view of an alternate embodiment of the separation system having a prior phase separation means upstream of the inlet to an eccentric frusto-conical chamber.

The embodiment of FIG. 5 is utilized in an application where change in flow direction is desirable because of confined quarters. In this embodiment an eccentric frusto-conical chamber is situated at the 90° side outlet of a dead-ended chamber 40. A dead end 42 of the chamber 40 provides a surface upon which the mixed phase gas-solids stream impinges prior to completing the 90° change of direction and entering the inlet 20 leading to the eccentric frusto-concial chamber 10. The dead end 42 of the chamber 40 behaves as a phase separation device causing the mixed phase gassolids stream to separate substantially into a solids phase and a gas phase. The solids, upon impinging the dead end 42 of the chamber 40 descend downwardly along the wall of the inlet 20 to the eccentric frusto-conical chamber 10. The gas phase enters chamber 10 and exits through the openings 34 in the conical wall 26.

It should be noted that the eccentric frustoconical chamber may also be used with the riser configurations shown in FIGS. 1, 2A, 2B and 2C.

Figure 4B:
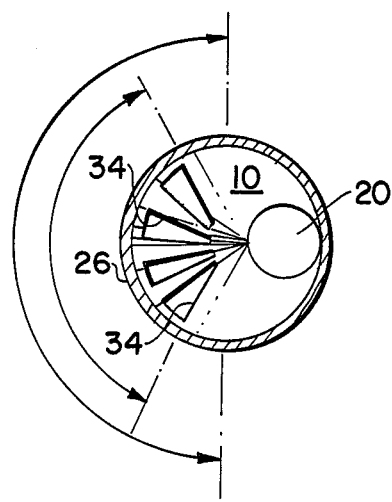

Referring to FIG. 4B, there is shown a cutaway view of the eccentric frusto-conical chamber 10 taken along line 4a—4a of FIG. 4A. As seen, the openings 34 in the conical wall 26 are optimally limited to a maximum range of 180° from the centerline $C_L$. In addition, the openings 34 are uniformly spaced and of narrower breadth at the top than at the bottom.

Referring again to FIGS. 2A and 2B, practice has taught that the mixed phase gas-solids stream velocity in inlet 20 should be in the range of 50 to 100 feet per second (fps), preferably 65 to 80 fps depending on solids loading and allowable pressure drop. Upon entering the frusto-conical chamber 10, the gas velocity instantaneously decreases due to the increased cross sectional area at the inlet to the chamber 10. It has been found that an angle $\theta$ of 2° to 15° of the frusto-conical wall 26, preferably 4°, provides suitable separation of the gas and solids phases while still being mechanically acceptable within normal spatial and equipment constraints.

The slots 34 in the conical wall 26 are preferably longitudinal and of uniform width over the length of the frusto-conical chamber 10. The slots 34 are preferably arranged in a symmetrical pattern. The surface area of the slots 34 is approximately 25 to 60%, preferably 40 to 55% of the total surface area of the conical wall 26.

Assuming an inside diameter $D_i$ of the inlet 20, inside diameter $D_{og}$ of the gas phase outlet 12 should be approximately equal or smaller. It has been found that the height H of the outer chamber 6 is preferably eight times $D_i$ to obtain improved separator efficiency. The length of slots 34 are preferably four times $D_i$. The width of the outer chamber 6 is preferably 2.0 times $D_i$. This dimension enables a preferred gas phase velocity of 20 to 80 fps at the top of the annulus 30 to be achieved. At any elevation within the separator 2, the upward velocity at any elevation in the annulus 30 should preferably be about equal to or less than the downward velocity at the same elevation in the frusto-conical chamber 10 so as to avoid a venturi effect which would result in re-entrainment of already separated solids.

In the embodiment of FIG. 2C, a plurality of circular baffles 36 are spaced and affixed to the inside surface of the conical walls 26. These baffles 36 are preferably of uniform width and provide a longer average lateral flow path for gas exiting through the slots 34 thereby providing improved solids removal efficiency.

The separator efficiency of the embodiment of FIGS. 2A and 2B, defined as the removal of solids from the gas phase leaving through outlet 12, is about 97% for the separator of the present invention when the separator is operated with an inlet gas velocity (in inlet 20) of about 70 ft/sec, and with a typical FCCU size distribution as shown in Table 1. The calculated separator efficiency of the RCS is independent of the inlet solids loading, which is on the order of 0.8–1.8 lbs. catalyst/ACF gas at the top of a typical FCCU reaction riser.

The separator embodiment of FIGS. 2A and 2B is more clearly illustrated and explained by the example which follows. In this example, the separator has the critical dimensions specified in Table I. These dimensions (in inches) are defined in the nomenclature below:

$D_i$: Inside diameter of inlet 20
$D_{og}$: Inside diameter of gas outlet 12
$D'_{os}$: Inside diameter of first solids outlet 16
$D''_{os}$: Inside diameter of second solids outlet 19
$H_t$: Overall height of separator 2
$H_{fc}$: Height of frusto-conical chamber 10
$L_i$: Length of inlet from top of separator to inlet of frusto-conical chamber 10
$D_{ifc}$: Inside diameter of inlet of frusto-conical chamber 10
$D_{ofc}$: Inside diameter of outlet of frusto-conical chamber 10
$W_s$: Width of slots 34
$L_s$: Length of slots 34
$\theta$: Angle of the frusto-conical walls 26 to the vertical

EXAMPLE

In the example, the separator of the preferred embodiment is applied to an FCC reactor riser effluent containing high-temperature spent catalyst and cracked hydrocarbons.

If the inlet stream is comprised of 468 ACFS of cracked hydrocarbon and steam at a solids loading of 1.6 lbs. catalyst/ACF gas with a solids particle density of 89 lbs./ft$^3$ and an average particle size of 69 microns at a temperature of 980° F., the gas velocity of the inlet stream through the inlet 20 would be 68 ft/sec while the outlet velocity at the top of the annulus 30 would be 24 ft/sec. The particle size distribution of the solids feed is shown in Table 1.

The separator efficiency would be 97.2 percent and would be accomplished in a gas phase residence time in the frusto-conical chamber 10 of approximately 0.38 seconds. Efficiency is defined as the weight percent solids collected from the inlet stream.

The calculated particle size distribution of the 97.2% recovered solids is as follows:

| Cumulative weight percent: | 1 | 10 | 20 | 50 | 70 | 80 | 90 | 100 |
|---|---|---|---|---|---|---|---|---|
| Particle size (microns): | 34 | 47 | 53 | 68 | 80 | 89 | 103 | 143 |

The calculated particle size distribution of the 2.8% solids loss is as follows:

| Cumulative weight percent: | 1 | 10 | 20 | 50 | 70 | 80 | 90 | 100 |
|---|---|---|---|---|---|---|---|---|
| Particle size (microns): | 25 | 30 | 32 | 35 | 37 | 38 | 39 | 50 |

Figure 6:
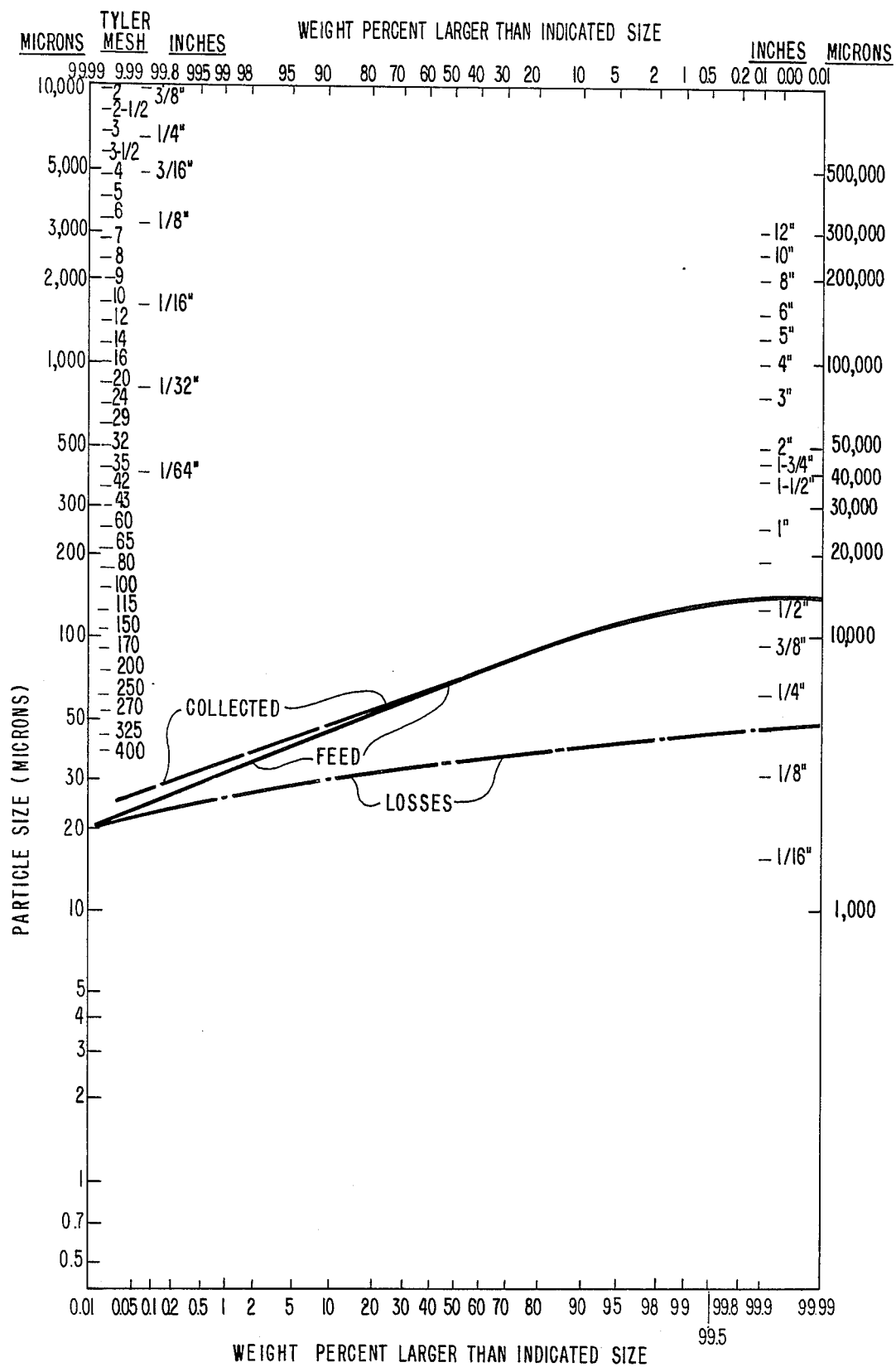
FIG. 6 is a plot of the particle size distribution for the feed solids, collected solids and lost solids of Example 1.

The feed solids, collected solids and lost solids size distributions are plotted as a function of cumulative weight percent in FIG. 6.

Figure 7:
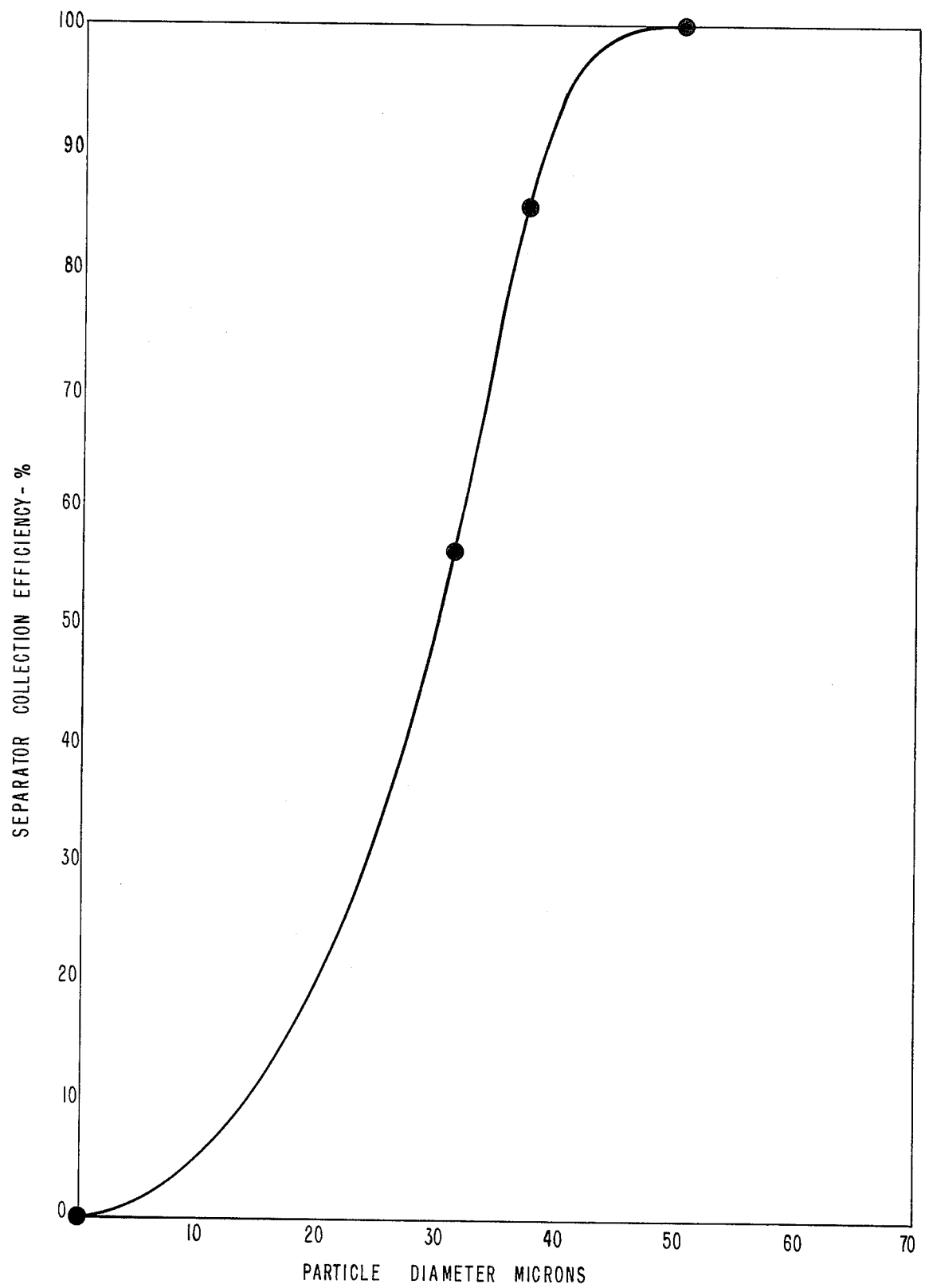
FIG. 7 is a plot of the fractional collection efficiency versus particle size for the separator of the present invention.

The calculated fractional efficiency for the rough cut separator is plotted as a function of particle size in FIG. 7. As indicated above, the overall separator efficiency is 97.2 percent.

For comparison, a similar set of calculations were performed for a cylindrical separator having the same inlet dimensions and configuration, but having straight vertical sides instead of outwardly-tapering conical sides. The vertical wall was provided with openings or slots comparable to those shown in the present invention. The estimated efficiency for the cylindrical separator was only 75.7% versus the 97.2% collection efficiency achievable with the rough cut separator.

The invention in its broader aspects is not limited to the specific described embodiment and departures may be made therefore within the scope of the accompanying claims without departing from the principles of the invention and without sacrificing its chief advantages.

TABLE 1
EXAMPLE OF ROUGH CUT SEPARATOR

| Separator Dimensions | | Feed Particle Size Distribution (FCCU) | |
|---|---|---|---|
| | | Size (microns) | Weight Percent (cumulative) |
| $D_i$ | 35.5" | 20 | 0 |
| $D_{og}$ | 35.5" | 31 | 1 |
| $D'_{os}$ | 23.0" | 39 | 5 |
| $D''_{os}$ | 33.5" | 44 | 10 |
| $H_t$ | 319.5" | 50 | 20 |
| $H_{fc}$ | 144.0" | 62 | 40 |
| $L_i$ | 108.0" | 69 | 50 |
| $D_{ifc}$ | 41.0" | 80 | 70 |
| $D_{ofc}$ | 63.0" | 89 | 80 |
| $W_s$ | 14.0" | 103 | 90 |
| $L_s$ | 144.5" | 143 | 100 |
| $\theta$ | 4.4° | | |

What is claimed is:

1. A gas-solids separator designed to effect rapid and efficient removal of particulate solids from a mixed phase stream of solids and gas, the separator comprising:
   a mixed phase inlet;
   a solids phase outlet;
   a frusto-conical chamber, having substantially conical walls tapering downwardly and outwardly and a bottom wall connected to said conical walls, wherein the upper end of said chamber communicates with said mixed phase inlet and said bottom wall communicates with said solids phase outlet; and
   means defining at least one opening in said downwardly and outwardly tapering conical walls of said frusto-conical chamber for conveying through said conical walls substantially solids free gas separated from the mixed stream of solids and gas.

2. The gas-solids separator of claim 1, further comprising an outer chamber spaced from said frusto-conical chamber and closed at its top, said outer chamber having generally cylindrical walls, a gas phase outlet near the top of said outer chamber and a second solids phase outlet at the bottom of said outer chamber, whereupon the gas conveyed from said frusto-conical chamber through said conical walls and into said outer chamber is further separated from the solids and exits said outer chamber through said gas phase outlet and the separated solids are removed from said outer chamber through said second solids phase outlet.

3. The gas solids separator of claim 1 further comprising an outer chamber spaced from said frusto-conical chamber and closed at its top, said outer chamber having generally cylindrical walls and attached to the bottom of said frusto-conical chamber and a gas phase outlet near the top of said outer chamber, whereupon the gas conveyed from said frusto-conical chamber through said conical walls and into said outer chamber exits said outer chamber through said gas phase outlet and the solids separated in said frusto-conical chamber are removed through said solids phase outlet.

4. The gas-solids separator of claim 1, wherein the means defining at least one opening comprises four equally spaced rectangular openings extending longitudinally, and the area of said openings is in the range of 25 to 60 percent of the total surface area of said downwardly and outwardly tapering conical walls of said frusto-conical chamber.

5. The gas-solids separator of claim 1, wherein said mixed phase inlet has a diameter $D_i$, said diameter being less than the diameter of the upper end of said frusto-conical chamber.

6. The gas-solids separator of claim 1, wherein the bottom wall connected to said conical walls tapers downwardly and inwardly.

7. The gas-solids separator of claim 1, wherein said conical walls of said frusto-conical chamber are at an angle in the range of 2 to 15 degrees to the vertical axis of said frusto-conical chamber.

8. The gas-solids separator claim 7, wherein said angle is 4.4 degrees.

9. The gas-solids separator of claim 1, wherein said frusto-conical chamber is eccentric to the axis of said mixed phase inlet.

10. The gas-solids separator of claim 9 wherein said mixed phase inlet communicates at the top with a right angle fitting which effects a 90 degree directional change in the mixed phase stream of solids and gas prior to entering said mixed phase inlet.

11. The gas-solids separator of claim 9, wherein the means defining at least one opening comprises four openings extending longitudinally over a 180 degree arc of said downwardly and outwardly tapering conical walls.

12. The gas-solids separator of claim 11, wherein said openings have a greater breadth at the bottom than at the top.

13. In an FCC system having a tubular riser reactor means for delivering hot regenerated catalyst particulate solids to the riser reactor, means for delivering hydrocarbon feed to the riser reactor, the improvement comprising a gas-solids separator designed to effect rapid removal of particulate solids from a mixed phase stream of solids and gas exiting the riser reactor, said separator being affixed to the top of the riser reactor and including a cap for effecting a 180° change in direction of the mixed phase stream for introduction of the stream to the gas-solids separator, said separator comprising a mixed phase inlet in communication with a frusto-conical chamber having substantially conical walls tapering downwardly and outwardly and a solids phase outlet at the bottom of said frusto-conical chamber and means defining at least one opening in said downwardly and outwardly tapering walls of said frusto-conical chamber for conveying through said conical walls substanatially solids free gas separated from the mixed phase stream of solids and gas.

14. A system as in claim 13, wherein the means defining at least one opening comprises four equally spaced rectangular slot openings extending longitudinally, and the area of said openings being in the range of 25 to 60 percent of the total surface area of said downwardly and outwardly tapering conical walls of said frusto-conical chamber.

15. A system as in claim 13, wherein said conical wall of said frusto-conical chamber is at an angle in the range of 2 to 15 degrees to the vertical axis of said frusto-conical chamber.

16. A system as in claim 15, wherein said angle is 4.4 degrees.

* * * * *